(12) United States Patent
Murthy et al.

(10) Patent No.: US 8,805,990 B2
(45) Date of Patent: Aug. 12, 2014

(54) LOAD BALANCING FOR SINGLE-ADDRESS TENANTS

(75) Inventors: Ashwin Murthy, Bellevue, WA (US); Parveen Kumar Patel, Redmond, WA (US); Deepak Bansal, Sammamish, WA (US); Marios Zikos, Alexandroupolis (GR)

(73) Assignee: Microsoft Corporation, Redmond, WA (US)

( * ) Notice: Subject to any disclaimer, the term of this patent is extended or adjusted under 35 U.S.C. 154(b) by 60 days.

(21) Appl. No.: 13/547,805

(22) Filed: Jul. 12, 2012

(65) Prior Publication Data

US 2014/0019602 A1 Jan. 16, 2014

(51) Int. Cl.
*G06F 15/173* (2006.01)

(52) U.S. Cl.
CPC .................................. *G06F 15/173* (2013.01)
USPC ............................ 709/223; 709/224; 709/221

(58) Field of Classification Search
CPC ... H04L 47/125; H04L 67/1002; H04L 45/22; H04L 45/24; H04L 45/70; H04L 45/72; H04L 45/74; H04L 45/745; H04L 41/0803; H04L 41/08; H04L 41/0813; H04L 41/0816
USPC ................................................. 709/220–224
See application file for complete search history.

(56) References Cited

U.S. PATENT DOCUMENTS

| 5,371,852 A | 12/1994 | Attanasio et al. |
| 6,070,191 A | 5/2000 | Narendran |
| 6,128,279 A | 10/2000 | O'Neil et al. |
| 6,351,775 B1 | 2/2002 | Yu |
| 7,280,557 B1 * | 10/2007 | Biswas et al. ................. 370/465 |
| 7,512,702 B1 * | 3/2009 | Srivastava et al. ............ 709/238 |
| 7,567,504 B2 | 7/2009 | Darling et al. |
| 7,590,736 B2 | 9/2009 | Hydrie et al. |
| 7,613,822 B2 | 11/2009 | Joy |

(Continued)

FOREIGN PATENT DOCUMENTS

JP         2002288038 A    * 10/2002

OTHER PUBLICATIONS

Greenberg, et al., "Towards a Next Generation Data Center Architecture: Scalability and Commoditization", In Proceedings of the ACM Workshop on Programmable Routers for Extensible Services of Tomorrow, Aug. 22, 2008, pp. 57-62.

(Continued)

*Primary Examiner* — Kostas Katsikis
(74) *Attorney, Agent, or Firm* — Ben Tabor; David Andrews; Micky Minhas

(57) ABSTRACT

When a load balancer detects that a virtual address is associated with a single destination address, the load balancer sets a flag to distinguish the virtual address from virtual addresses that are associated with a plurality of destination addresses. The load balancer instructs the router to bypass the load balancer for network packets that are addressed to the virtual address, and refrains from storing subsequent flow state for the virtual address. When the virtual address is to be scaled up with an additional destination address, the load balancer sets a flag to distinguish the virtual address from virtual addresses that are associated with a single destination addresses. The load balancer instructs the router to route network packets that are addressed to the virtual address through the load balancer, instead of bypassing the load balancer, and starts storing flow state for the virtual address.

20 Claims, 6 Drawing Sheets

(56) References Cited

U.S. PATENT DOCUMENTS

| | | | |
|---|---|---|---|
| 7,685,109 | B1 | 3/2010 | Ransil |
| 8,112,545 | B1 | 2/2012 | Ong |
| 2002/0040402 | A1 | 4/2002 | Levy-Abegnoli et al. |
| 2003/0005080 | A1 | 1/2003 | Watkins et al. |
| 2003/0202536 | A1* | 10/2003 | Foster et al. ............... 370/469 |
| 2004/0109447 | A1* | 6/2004 | Douglass et al. ............ 370/389 |
| 2004/0117794 | A1 | 6/2004 | Kundu |
| 2004/0162914 | A1* | 8/2004 | St. Pierre et al. ............ 709/245 |
| 2005/0055435 | A1* | 3/2005 | Gbadegesin et al. ......... 709/224 |
| 2005/0132030 | A1* | 6/2005 | Hopen et al. ................. 709/223 |
| 2005/0149531 | A1* | 7/2005 | Srivastava ..................... 707/10 |
| 2005/0188055 | A1* | 8/2005 | Saletore ........................ 709/218 |
| 2005/0198238 | A1* | 9/2005 | Sim et al. ..................... 709/222 |
| 2005/0249199 | A1* | 11/2005 | Albert et al. ................. 370/352 |
| 2005/0261985 | A1 | 11/2005 | Miller et al. |
| 2006/0294584 | A1* | 12/2006 | Sundaram ..................... 726/11 |
| 2007/0055789 | A1 | 3/2007 | Claise et al. |
| 2007/0124476 | A1 | 5/2007 | Oesterreicher et al. |
| 2007/0165622 | A1* | 7/2007 | O'Rourke et al. ............ 370/389 |
| 2008/0104273 | A1* | 5/2008 | Bruck et al. .................. 709/238 |
| 2008/0183854 | A1* | 7/2008 | Hopen et al. ................. 709/223 |
| 2008/0259917 | A1 | 10/2008 | Hua |
| 2010/0036903 | A1 | 2/2010 | Ahmad |
| 2010/0036954 | A1* | 2/2010 | Sakata et al. ................. 709/226 |
| 2010/0057898 | A1 | 3/2010 | Imai |
| 2010/0095008 | A1* | 4/2010 | Joshi ............................. 709/228 |
| 2010/0218254 | A1* | 8/2010 | Gray et al. .................... 726/23 |
| 2010/0268764 | A1 | 10/2010 | Wee et al. |
| 2010/0302940 | A1 | 12/2010 | Patel et al. |
| 2011/0225231 | A1* | 9/2011 | Bansal et al. ................. 709/203 |
| 2011/0235508 | A1 | 9/2011 | Goel et al. |
| 2012/0099601 | A1 | 4/2012 | Haddad et al. |
| 2012/0155266 | A1* | 6/2012 | Patel et al. .................... 370/235 |
| 2012/0207174 | A1* | 8/2012 | Shieh ............................ 370/401 |
| 2012/0303809 | A1* | 11/2012 | Patel et al. .................... 709/225 |
| 2013/0148505 | A1* | 6/2013 | Koponen et al. ............. 370/235 |
| 2013/0159487 | A1* | 6/2013 | Patel et al. .................... 709/223 |
| 2014/0029430 | A1 | 1/2014 | Samuels et al. |

OTHER PUBLICATIONS

Alur, Sanjeev J., "Enterprise Integration and Distributed Computing: A Ubiquitous Phenomenon", Published on: Dec. 27, 2008, Available at: http://msdn.microsoft.com/en-us/library/cc949110.aspx.

Joseph, et al., "A Policy-Aware Switching Layer for Data Centers", In Proceedings of the ACM SIGCOMM Conference on Data Communication, Aug. 17, 2008, pp. 51-62.

Al-Fares, et al., "Hedera: Dynamic Flow Scheduling for Data Center Networks", In Proceedings of the 7th USENIX Conference on Networked Systems Design and Implementation, Apr. 28, 2010, pp. 281-295.

Stage, et al., "Network-aware Migration Control and Scheduling of Differentiated Virtual Machine Workloads", In Workshop on Software Engineering Challenges in Cloud Computing, May 23, 2009, pp. 9-14.

"Load Balancing: Optimum Performance, Scalability and Resiliency", Available at least as early as Apr. 20, 2012, available at: http://www.contegix.com/solutions/managed-hosting/managed-services/load-balancing/.

Nehra, Neeraj, et al., "A Framework for Distributed Dynamic Load Balancing in Heterogeneous Cluster", Journal of Computer Science 3 (1): Jan. 2007 Science Publications, pp. 14-24.

Bunt, Richard B., et al., "Achieving Load Balance and Effective Caching in Clustered Web Servers", Proceedings of the Fourth International Web Caching Workshop, San Diego, CA, Apr. 1999, pp. 159-169.

K2 Colocation, Network Load Balancing Appliance, Intelligent Routing Network Appliance, "Flow Control Platform (FCP) Solutions", Jan. 4, 2007, 2 pages.

White Paper, Equalizer, "Purpose-Built Load Balancing the Advantages of Coyote Point Equalizer over Software-based Solutions", Copyright 2004 Coyote Point Systems, Inc. 9 pages. (The month of Publication is irrelevant since the year of Publication is clearly prior to the filing of the Application).

Microsoft TechNet, "MS Windows NT Load Balancing Service Whitepaper", Based on current information and belief, this reference was available at least as early as Jul. 27, 2010, 9 pages.

HAProxy, "The Reliable, High Performance TCP/HTTP Load Balancer", Jun. 16, 2010, 10 pages.

Top Web Hosting, "Load Balancing", Copyright 2002-2010, Based on current information and belief, this reference was available at least as early as Jul. 27, 2010, 6 pages.

Linux.com, WALCOTT, Costa, "Taking a load off: Load balancing with balance", Aug. 17, 2005, 7 pages.

InfoBPN Solutions on Business Process Networking Business and Process Automation, "Application Load Balancing Solution", Based on current information and belief, this reference was available at least as early as Jul. 27, 2010.

U.S. Appl. No. 12/972,340, filed Feb. 25, 2013, Office Action.
U.S. Appl. No. 19/972,340, filed Dec. 18, 2013, Notice of Allowance.
U.S. Appl. No. 13/115,444, filed Apr. 15, 2013, Office Action.
U.S. Appl. No. 13/115,444, filed Sep. 13, 2013, Office Action.
U.S. Appl. No. 13/115,444, filed Jan. 30, 2014, Office Action.
Notice of Allowance dated Feb. 14, 2014 in U.S. Appl. No. 12/972,340.

\* cited by examiner

LOAD BALANCING FOR SINGLE-ADDRESS TENANTS

BACKGROUND

1. Background and Relevant Art

In many computing environments, it is a common practice to deploy load balancers, which are configured to distribute network packets across a plurality of computer systems. Load balancers manage one or more virtual addresses, which each maps to one or more destination addresses. When a load balancer receives a network packet that is addressed to a particular virtual address, the load balancer determines a corresponding destination address to which the network packet is to be sent, and routes the network packet accordingly.

For example, some cloud computing environments may include a load balancer that is coupled to one or more virtualization host computer systems. Each virtualization host computer system is configured to execute one or more virtual machines for one or more tenants. Each virtual machine is associated with at least one corresponding destination address (e.g., a destination Internet Protocol address ("DIP")), and the load balancer manages at least one virtual address (e.g., a virtual IP address ("VIP")) for each tenant. Each virtual address serves as a front-end for receiving network packets on behalf of a corresponding tenant. When the load balancer receives a network packet that is addressed to the virtual address of a particular tenant, the load balancer routes the network packet to a destination address (and, correspondingly, a virtual machine) of the particular tenant.

When determining which destination address to which a network packet should be sent, load balancers may select the destination address based on current load of destination machines, a round-robin selection, a random selection, or any other appropriate selection mechanism. At times, load balancers may include rules that are used to identify the destination address. The rules may cause packets of particular types to be routed to particular types of machines. For example, some rules may cause network packets relating to a web page request to be routed to a first virtual machine, and cause network packets relating to a database request to be routed to a second virtual machine.

In addition, load balancers generally maintain connection-specific state information that is used to identify how packets in a flow or connection should be routed. For example, when an initial packet of a flow is received at a load balancer, the load balancer may determine that packets in the flow should be routed to a particular destination address. The load balancer can then store state information that can be used to identify subsequent packets in the flow and the destination address. As such, when the subsequent packets are received, the load balancer sends the subsequent packets to the same destination address. State information can also be used to handle failure scenarios without breaking connections through the load balancer. Storing state information, however, is memory intensive and adversely affects the overall scalability of the load balancer.

BRIEF SUMMARY

At least some embodiments described herein optimize load balancing for single-address tenants. For instance, the optimization might enable a load balancer to refrain from storing state information for a virtual address when the virtual address maps to only one destination address. As such, embodiments described herein can reduce the overhead of managing virtual address and can improve the performance and scalability of load balancers.

In some embodiments, load balancing is configured for a virtual address that maps to a single address. A load balancer detects that a virtual address that is being managed by the load balancer is associated with only a single destination address. In response to this detection, the load balancer sets a flag for the virtual address, to distinguish the virtual address from other virtual addresses that are associated with a plurality of destination addresses. Also in response to this detection, the load balancer sends a configuration message to a router. The configuration message is interpretable by the router as an instruction to send network packets that are addressed to the virtual address to the destination address, in a manner that bypasses the load balancer. Subsequent to sending the configuration message to the router, the load balancer refrains from storing subsequent flow state for the virtual address.

In other embodiments, load balancing is scaled up for a virtual address from a single address to a multiple addresses. A load balancer detects that a virtual address that is being managed by the load balancer is to be scaled up from being associated with only a first destination address to being associated with an additional destination address. In response to the detection, the load balancer sets a flag for the virtual address, to distinguish the virtual address from other virtual addresses that are associated with a single destination address. Also in response to the detection, the load balancer sends a configuration message to a router. The configuration message is interpretable by the router as an instruction to send network packets that are addressed to the virtual address to the load balancer, and to cease a previous practice to bypass the load balancer for network packets that are addressed to the virtual address. Subsequent to sending the configuration message to the router, the load balancer stores flow state for the virtual address.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
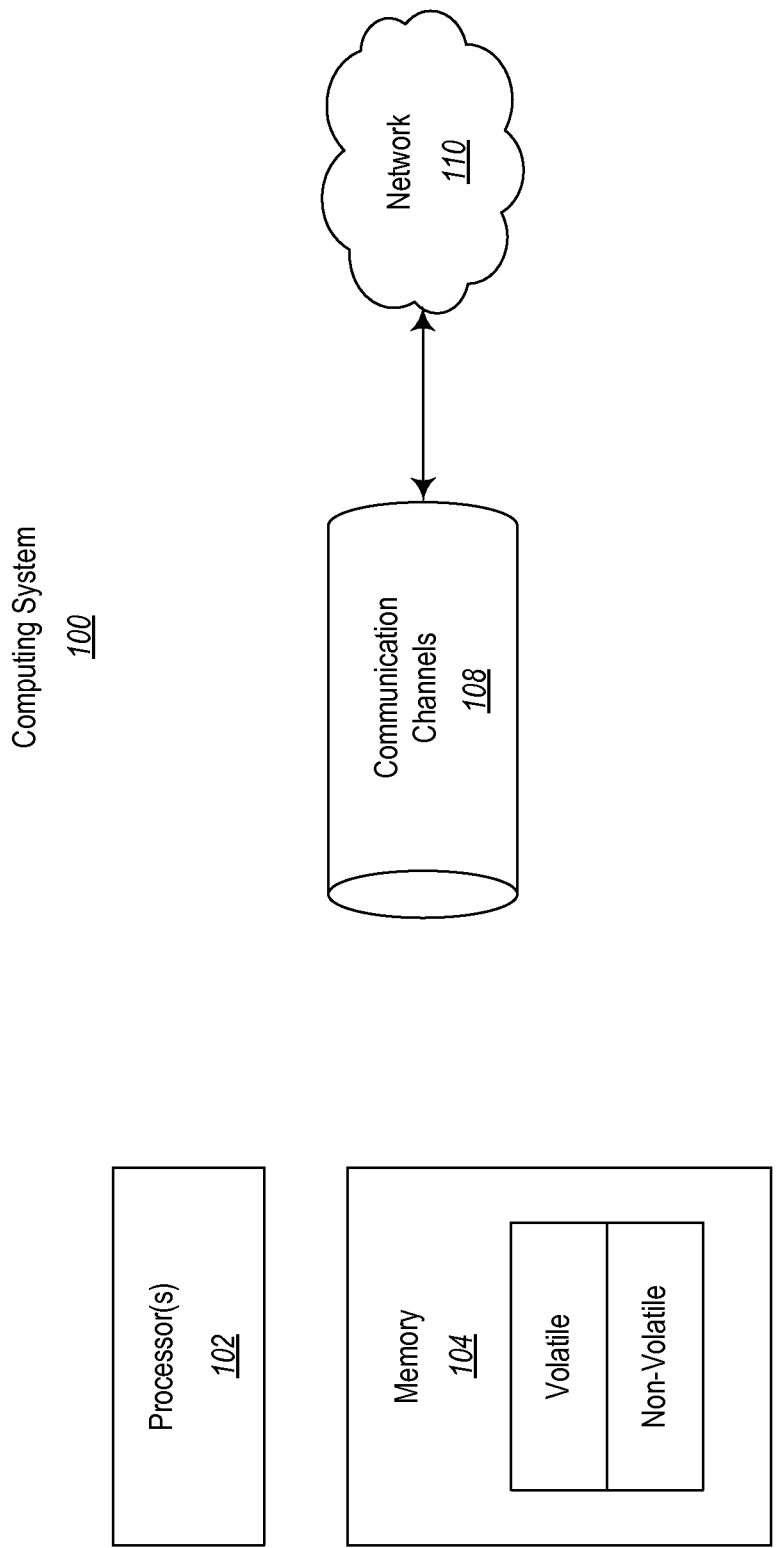
FIG. 1 illustrates an exemplary computing system on which the principles described herein may be employed.

At least some embodiments described herein optimize load balancing for single-address tenants. For instance, the optimization might enable a load balancer to refrain from storing state information for a virtual address when the virtual address maps to only one destination address. As such, embodiments described herein can reduce the overhead of managing a virtual address and can improve the performance and scalability of load balancers.

First, some introductory discussion regarding general computing systems and computing environments in or on which the principles described herein may be employed will be described with respect to FIGS. 1-3. Then, the basic principles for optimizing load balancing for single-address tenants will be described with respect to FIGS. 4-6.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having stored thereon computer-executable instructions that may be executed by the processor(s). The memory may take any form and may depend on the nature and form of the computing system. A computing system may be distributed over a network environment and may include multiple constituent computing systems.

Embodiments described herein may comprise or utilize a special purpose or general-purpose computer including computer hardware, such as, for example, one or more processors and system memory. For example, FIG. 1 illustrates an exemplary computing system 100. As illustrated in FIG. 1, in its most basic configuration, computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system 100 is distributed, the processing, memory and/or storage capability may be distributed as well. As used herein, the term "module" or "component" can refer to software objects or routines that execute on the computing system 100. The different components, modules, engines, and services described herein may be implemented as objects or processes that execute on the computing system 100 (e.g., as separate threads).

In the description that follows, embodiments are described with reference to acts that are performed by one or more computing systems, such as the computing system 100. If such acts are implemented in software, one or more processors of the associated computing system that performs the acts direct the operation of the computing system in response to having executed computer-executable instructions. An example of such an operation involves the manipulation of data. Within the context of the computing system 100, computer-executable instructions (and the manipulated data) may be stored in the memory 104. Computing system 100 may also contain communication channels 108 that allow the computing system 100 to communicate with other message processors over, for example, network 110.

Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes recordable-type storage media, such as RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network (e.g., the network 110) and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described herein using language specific to structural features and/or methodological acts, it is to be understood that the subject matter defined in the appended claims is not necessarily limited to the described features or acts described herein. Rather, the features and acts described herein are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
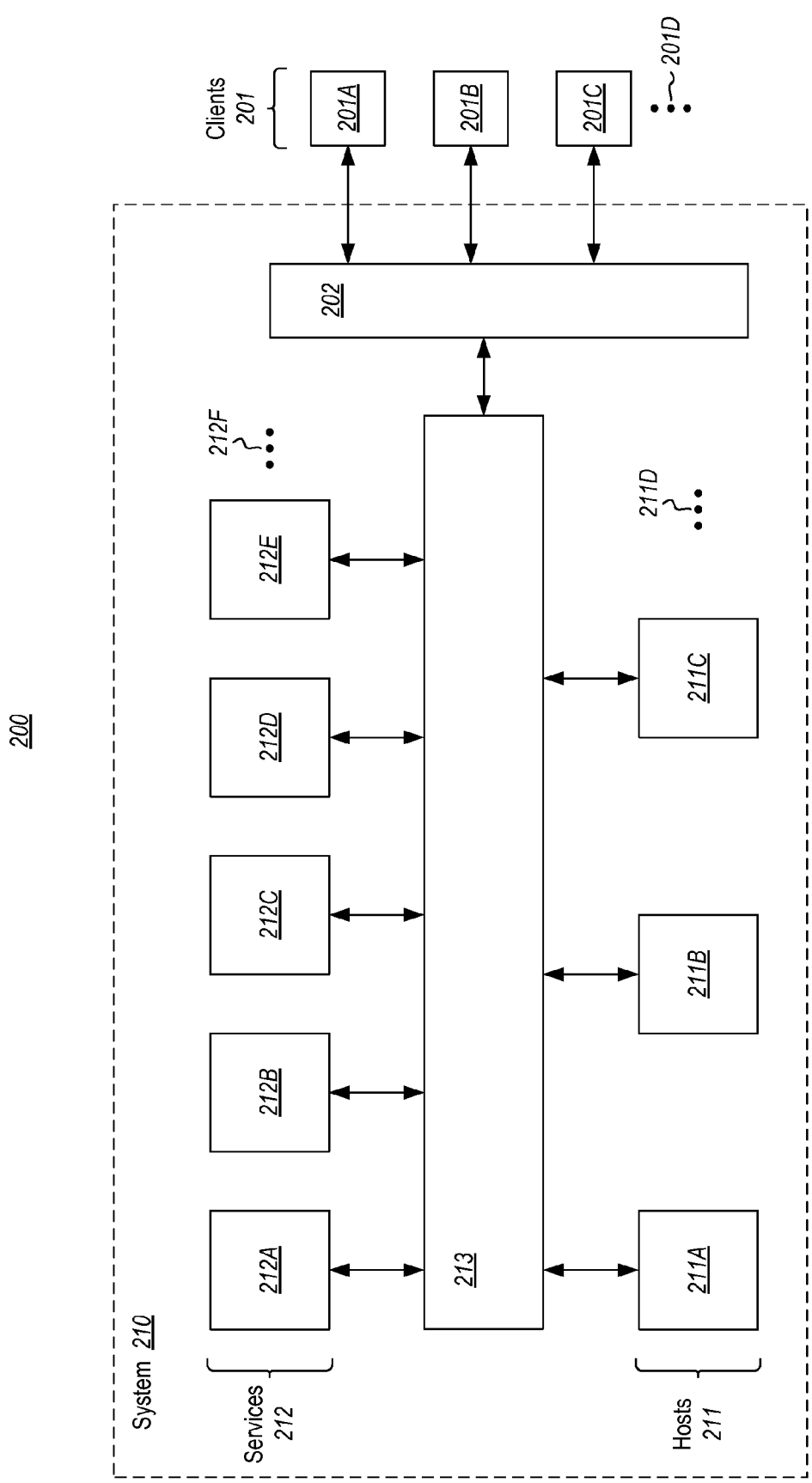
FIG. 2 illustrates an environment in which the principles described herein may be employed.
Figure 3:
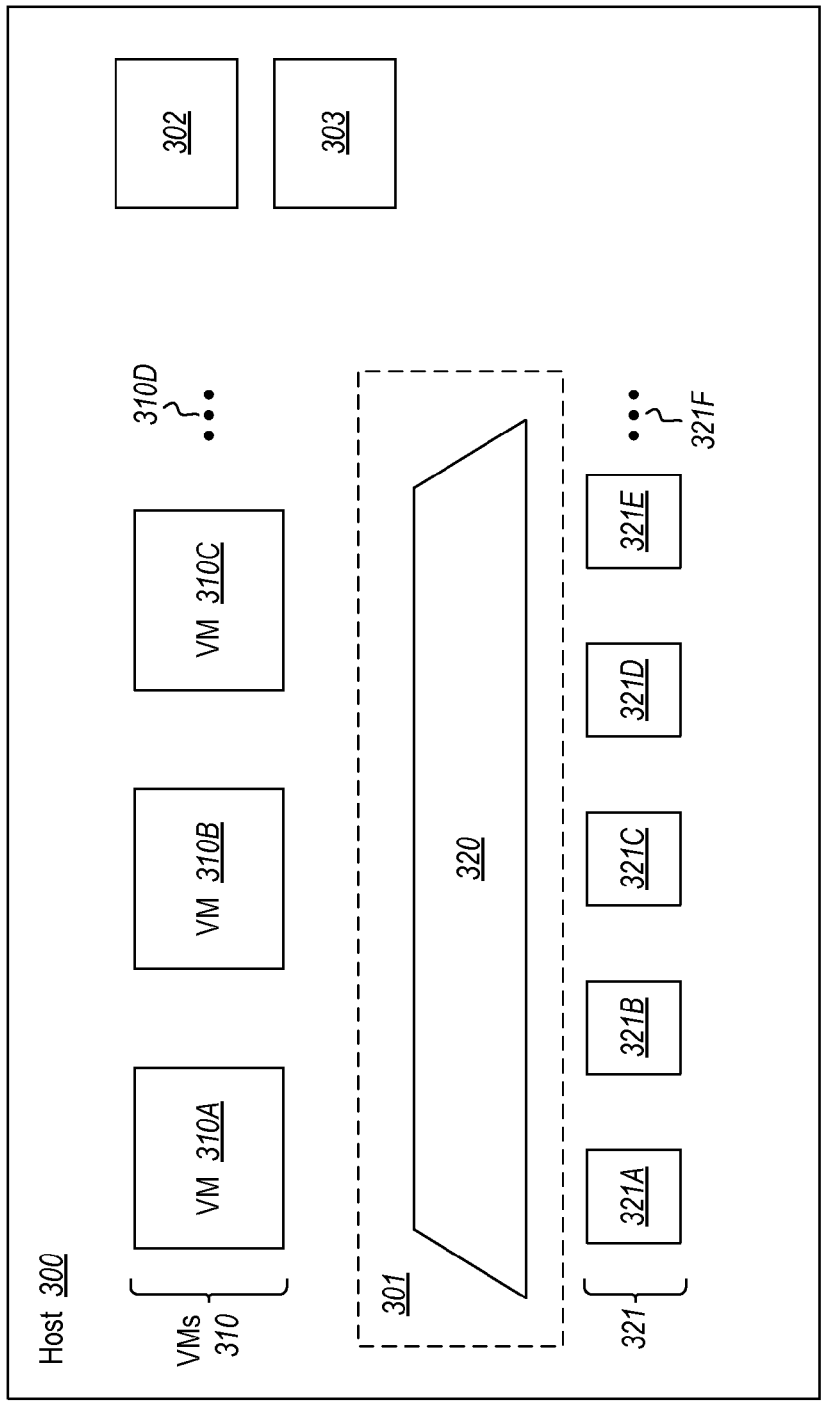
FIG. 3 illustrates a host on which the principles described herein may be employed.

FIG. 2 abstractly illustrates an environment 200 in which the principles described herein may be employed. The environment 200 includes multiple clients 201 interacting with a system 210 using an interface 202. The environment 200 is illustrated as having three clients 201A, 201B and 201C, although the ellipses 201D represents that the principles described herein are not limited to the number of clients interfacing with the system 210 through the interface 202. The system 210 may provide services to the clients 201 on-demand, and thus the number of clients 201 receiving services from the system 210 may vary over time.

One or more of the clients 201 may, for example, be structured as described above in accordance with computing system 100 of FIG. 1. Alternatively or in addition, one or more of the clients 201 may be an application or other software module that interfaces with the system 210 through the interface 202. The interface 202 may be an application program interface (API) that is defined in such a way that any computing system or software entity that is capable of using the API may communicate with the system 210.

The system 210 may be a distributed system, although this is not required. In one embodiment, the system 210 is a cloud computing environment. Cloud computing environments may be distributed, although not required, and may even be distributed internationally and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

As depicted, the system 210 includes multiple hosts 211, that are each capable of running virtual machines. Although the system 210 might include any number of hosts 211, there are three hosts 211A, 211B and 211C illustrated in FIG. 2, with the ellipses 211D representing that the principles described herein are not limited to the exact number of hosts that are within the system 210. There may be as few as one, with no upper limit. Furthermore, the number of hosts may be static, or might dynamically change over time as new hosts are added to the system 210, or as hosts are dropped from the system 210. Each of the hosts 211 may be structured as described above for the computing system 100 of FIG. 1.

Each host is capable of running one or more, and potentially many, virtual machines. For instance, FIG. 3 abstractly illustrates a host 300 in further detail. As an example, the host 300 might represent any of the hosts 211 of FIG. 2. In the case of FIG. 3, the host 300 is illustrated as operating three virtual machines 310 including virtual machines 310A, 310B and 310C. However, the ellipses 310D once again represents that the principles described herein are not limited to the number of virtual machines running on the host 300. There may be as few as zero virtual machines running on the host with the only upper limit being defined by the physical capabilities of the host 300.

During operation, the virtual machines emulates a fully operational computing system including an at least an operating system, and perhaps one or more other applications as well. Each virtual machine is assigned to a particular client, and is responsible to support the desktop environment for that client.

The virtual machine generates a desktop image or other rendering instructions that represent a current state of the desktop, and then transmits the image or instructions to the client for rendering of the desktop. For instance, referring to FIGS. 2 and 3, suppose that the host 300 of FIG. 3 represents the host 211A of FIG. 2, and that the virtual machine 310A is assigned to client 201A (referred to herein as "the primary example"), the virtual machine 310A might generate the desktop image or instructions and dispatch such instructions to the corresponding client 201A from the host 211A via a service coordination system 213 and via the system interface 202.

As the user interacts with the desktop at the client, the user inputs are transmitted from the client to the virtual machine. For instance, in the primary example and referring to FIGS. 2 and 3, the user of the client 201A interacts with the desktop, and the user inputs are transmitted from the client 201A to the virtual machine 310A via the interface 202, via the service coordination system 213 and via the host 211A.

The virtual machine processes the user inputs and, if appropriate, changes the desktop state. If such change in desktop state is to cause a change in the rendered desktop, then the virtual machine alters the image or rendering instructions, if appropriate, and transmits the altered image or rendered instructions to the client computing system for appropriate rendering. From the prospective of the user, it is as though the client computing system is itself performing the desktop processing.

The host 300 includes a hypervisor 320 that emulates virtual resources for the virtual machines 310 using physical resources 321 that are abstracted from view of the virtual machines 310. The hypervisor 320 also provides proper isolation between the virtual machines 310. Thus, from the perspective of any given virtual machine, the hypervisor 320 provides the illusion that the virtual machine is interfacing with a physical resource, even though the virtual machine only interfaces with the appearance (e.g., a virtual resource) of a physical resource, and not with a physical resource directly. In FIG. 3, the physical resources 321 are abstractly represented as including resources 321A through 321F.

Examples of physical resources 321 include processing capacity, memory, disk space, network bandwidth, media drives, and so forth.

The host 300 may operate a management agent 302 that monitors the performance of the host, and performs other operations that manage the host. Furthermore, the host 300 may include other components 303, such as a host agent as described later.

Referring back to FIG. 2, the system 200 also includes services 212. In the illustrated example, the services 212 include five distinct services 212A, 212B, 212C, 212D and 212E, although the ellipses 212F represents that the principles described herein are not limited to the number of service in the system 210. A service coordination system 213 communicates with the hosts 211 and with the services 212 to thereby provide services requested by the clients 201, and other services (such as authentication, billing, and so forth) that may be prerequisites for the requested service.

Figure 4:
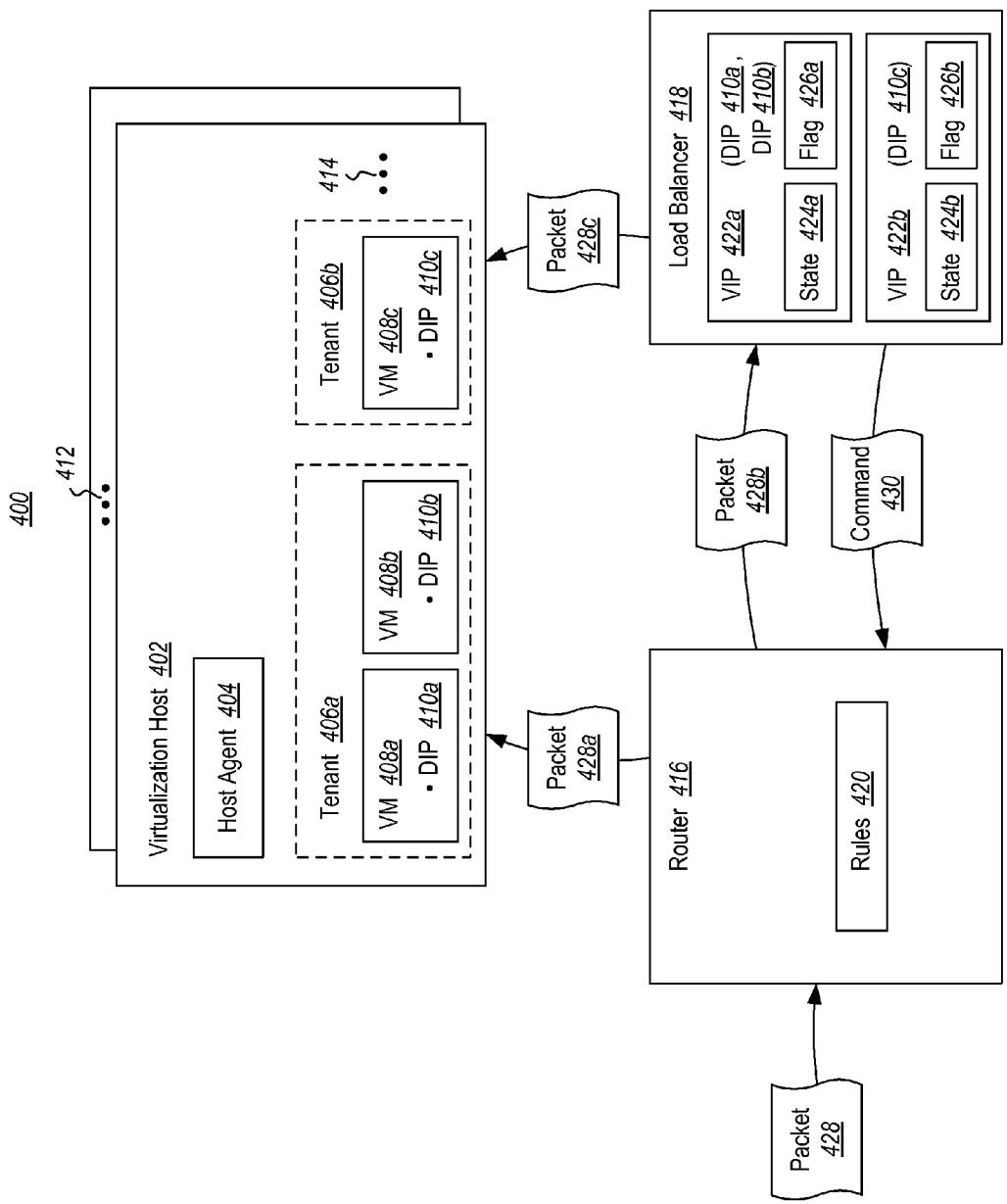
FIG. 4 illustrates an example computer architecture for optimizing load balancing for single-address tenants.

Turning now to FIG. 4, illustrated is an example computer architecture 400 for optimizing load balancing for single-address tenants within a virtualization environment. While embodiments of the invention are described primarily within the context of virtualization hosts and destination addresses that are associated with virtual machines, it will be appreciated, after reviewing the disclosure herein, that embodiments of the invention may also be practiced in the context of destination addresses that are associated with physical machines.

Referring to FIG. 4, computer architecture 400 includes virtualization host 402, router 416, and load balancer 418. Although not depicted, virtualization host 402, router 416, and load balancer 418 are interconnected through an appropriate communications mechanism, such as a network (e.g., a LAN, a WAN, etc.), a local bus, inter-process communications, etc. As such, virtualization host 402, router 416, and load balancer 418 are configured to communicate with one another directly and/or indirectly. In some embodiments, one or more of virtualization host 402, router 416, or load balancer 418 comprises distinct physical hardware (e.g., one or more of virtualization host 402, router 416, or load balancer 418 may comprise special-purpose computer hardware). In some embodiments, one or more of virtualization host 402, router 416, or load balancer 418 comprises the same physical hardware (e.g., one or more of virtualization host 402, router 416, or load balancer 418 may comprise a software module executing on general-purpose computer hardware).

Virtualization host 402 is configured to operate one or more virtual machines. As depicted by ellipses 412, computer architecture 400 can include any number (i.e., one or more) of virtualization hosts. Each virtualization host may be configured in accordance with host 300, as described above in connection with FIG. 3. Virtualization hosts can be configured to operate virtual machines for tenants. Each tenant logically groups virtual machines, and may correspond to organizational units, customers, departments, etc. As depicted, for example, virtualization host 402 operates two virtual machines (VM 408a and VM 408b) for tenant 406a, and one virtual machine (VM 408c) for tenant 406b. Each virtual machine is associated with at least one destination address (e.g., the depicted destination IP addresses DIP 410a, DIP 410b, and DIP 410c). As such, tenant 406a is a multi-address tenant associated with a plurality of destination addresses (DIP 410a and DIP 410b), and tenant 406b is a single-address tenant associated with a single destination addresses (DIP 410c). It will be appreciated, after having reviewed this description, that virtualization host 402 could operate any number (i.e., one or more) of tenants and virtual machines, as depicted by ellipses 414.

In addition, computer architecture 400 includes an agent that is configured to manipulate network packets, when necessary, so that they are routed to an appropriate destination address. Generally, the agent exists along a path between router 416 and a destination addresses. The agent may exist at the computer system that is associated with the destination address, at virtualization host 402 (i.e., the depicted host agent 404), etc. In some embodiments, host agent 404 executes as part of a virtual switch operating in a root partition at virtualization host 402. Host agent 404 may be configured with knowledge of which virtual machine(s) is/are associated with each tenant, and a destination address that is associated with each virtual machine.

Router 416 is configured to receive and route network packets according to rules 420. Router 416 can be configured to receive network packets from any appropriate source, such as from virtualization host 402 and/or load balancer 418, other components on a LAN, other components on a WAN, or even components on the Internet. As depicted, upon receiving a network packet (e.g., packet 428), router 416 may send the packet to load balancer 418 (e.g., as packet 428b), or router 416 may send the packet to virtualization host (e.g., as packet 428a) based on rules 420. In addition, router 416 is configured to modify rules 420 as instructed by command 430 received from load balancer 418.

Load balancer 418 is configured to receive network packets that are addressed to virtual addresses corresponding to tenants, and to route the received network packets to destination addresses associated with the tenants. Load balancer 418 may also be configured to receive network packets that are addressed to a virtual addresses corresponding to virtualization host 402, and to route the received network packets to a destination addresses associated with virtualization host 402. When a virtual address is associated with a multi-address tenant, load balancer 418 operates much like a conventional load balancer, routing network packets received at a single virtual address among a plurality of destination addresses. Unlike conventional load balancers, however, load balancer 418 is also configured to detect situations in which a virtual address is associated with a single-address tenant, and to treat these virtual addresses differently than virtual addresses that are associated with multi-address tenants.

Much like a conventional load balancer, for example, load balancer 418 is configured to manage virtual IP address VIP 422a for tenant 406a, a multi-address tenant operating VM 408a having DIP 410a and VM 408b having DIP 410b. When load balancer 418 receives a network packet that is addressed to VIP 422a (e.g., packet 428b from router 416), load balancer 418 identifies a proper destination address (i.e., one of DIP 410a or DIP 410b) to which the packet should be sent (e.g., using rules, random selection, round-robin selection, etc.), and sends the packet to virtualization host 402 (e.g., as packet 428c from load balancer 418 to virtualization host 402), where the packet is routed to the proper destination address. In doing so, load balancer 418 may perform any appropriate operation on the network packet so that it will reach the proper destination address. For example, load balancer 418 may encapsulate (encap) the network packet so that it reaches the proper destination address. Virtualization host 402 may perform a corresponding operation upon receiving packet 428c from load balancer 418. For example, host agent 404 may perform a corresponding decapsulate (decap) operation on the network packet. Load balancer 418 also stores state 424a for network flows associated with VIP 422a, so that load balancer 418 can ensure that all packets in a particular network flow are routed to the same destination address. State 424a can include information that identifies destination addresses corresponding to active flows. For example, load balancer 418 may store hashing information that can be used to identify that a packet corresponds to an active flow.

Whereas a conventional load balancer would treat single-address tenants similarly, load balancer 418 is configured to treat single-address tenants more efficiently by refraining from storing state information for single-address tenants, and by configuring router 416 to avoid routing network packets addressed to single-address tenant to load balancer 418. In particular, when load balancer 418 detects that a particular virtual address is associated with a single-address tenant, load balancer 418 sets a flag for the particular virtual address, which distinguishes the particular virtual address from other virtual addresses that are associated with multi-address tenants. Load balancer 418 also sends a configuration message (e.g., a Border Gateway Protocol message) to router 416, which instructs router 416 to route packets that are addressed to the particular virtual address directly to virtualization host 402, instead of routing them to load balancer 418. Load balancer 418 also stops maintaining state information for the particular virtual address when the particular virtual address is associated with only one destination address. Load balancer 418 therefore decreases the amount of memory used when servicing single-address tenants and also reduces the number of network hops traversed by a network packet that is addressed to a single-address tenant.

By way of example, FIG. 4 depicts that load balancer 418 is also configured to manage virtual IP address VIP 422b for tenant 406b, a single-address tenant operating VM 408c having DIP 410c. When load balancer 418 detects that tenant 406b is associated with only DIP 410c, load balancer 418 sends command 430 to router 416, instructing router 416 to modify rules 420 so that router 416 routes network packets addressed to VIP 422b directly to virtualization host 402, instead of routing such network packets to load balancer 418. Load balancer 418 also sets flag 426b, distinguishing VIP 422b from other virtual addresses that are associated with multi-address tenants (e.g., VIP 422a). Load balancer 418 also refrains from storing subsequent flow state for VIP 422b in state 424b. As such, when router 416 receives packet 428 addressed to VIP 422b, router 416 sends the packet directly to virtualization host 402 (e.g., as packet 428a), bypassing load balancer 418 completely.

When virtualization host 402 receives packet 428a, host agent 404 ensures that the packet is routed to DIP 410c. At this point, packet 428a may still be addressed to VIP 422b when it is received by virtualization host 402. In that case, host agent 404 may perform any appropriate operation on the network packet so that it will reach DIP 410c. For example, host agent 404 may detect when a network packet was sent from router 416, and as such is still addressed to a virtual address, and perform a NAT operation so that the packet is sent to the proper destination address. Host agent 404 can perform its alterations based on rules at host agent 404, or other configuration information at virtualization host 402.

As discussed, load balancer 418 sets a flag to distinguish virtual addresses associated with single-address tenants and virtual addresses associated with multi-address tenants. Flags can take any appropriate form, such as Boolean variables, integer variables, string variables, etc. In some embodiments, each virtual address is associated with a different corresponding flag (as depicted by flag 426a and flag 426b). For example, a Boolean variable associated with each virtual address can indicate whether the virtual address is associated with a single-address tenant or a multi-address tenant. In other embodiments, a single data structure may be used to distinguish a plurality of virtual addresses (e.g., a bitmap, a table, a list, etc.). As such, as used herein the term "flag" means any mechanism for distinguishing between virtual addresses that are associated with a single-address tenant and virtual addresses that associated with multi-address tenants, and which is used to determine whether or not to store subsequent state for the address.

Figure 5:
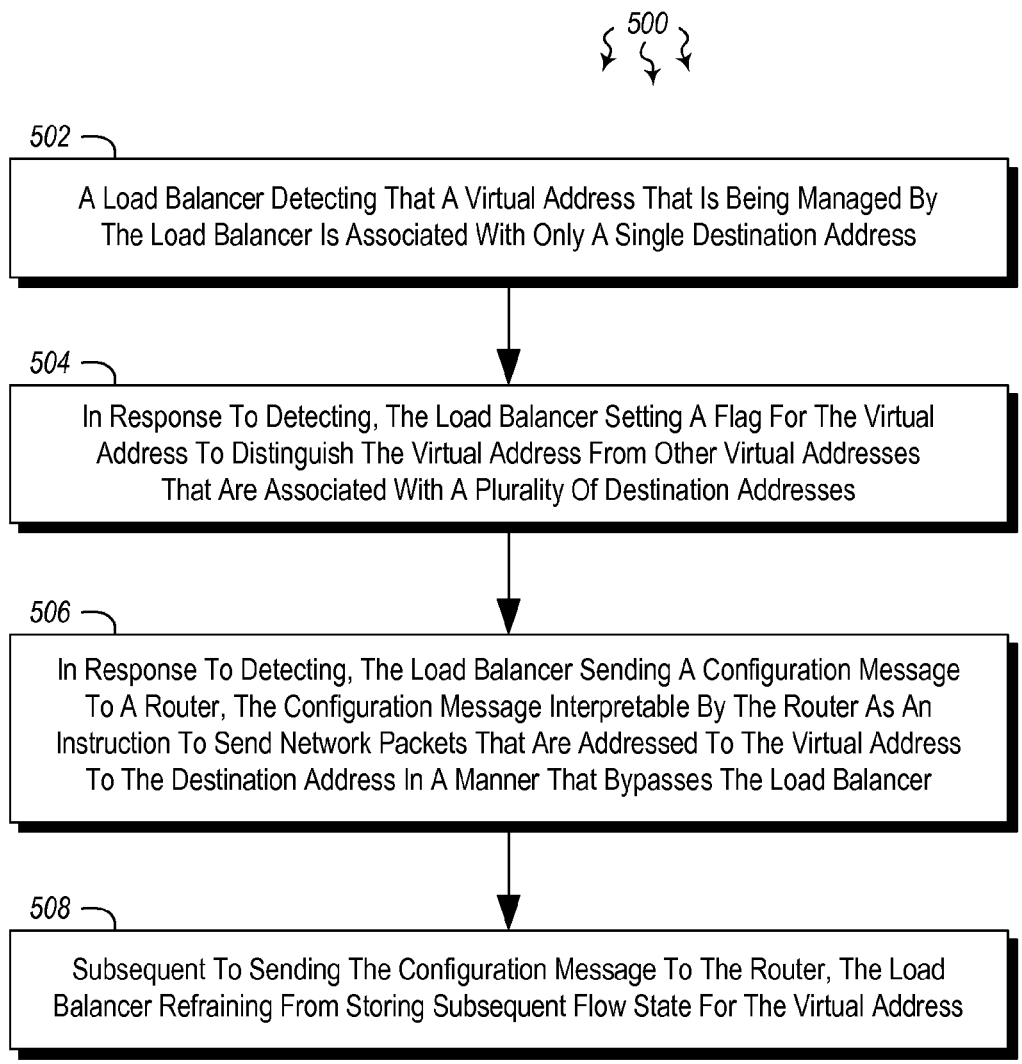
FIG. 5 illustrates a flow chart of an example method for configuring load balancing for a single-address tenant.

FIG. 5 illustrates a flowchart of a method 500 for configuring load balancing for a virtual address that maps to a single address. Method 500 will be described with respect to the components and data of computer architecture 400.

Method 500 includes an act of a load balancer detecting that a virtual address that is being managed by the load balancer is associated with only a single destination address (act 502). For example, load balancer 418 can detect that VIP 422b, which is associated with tenant 406b, is associated with only VM 408c and its destination address, DIP 410c. Tenant 406b may be a new single-address tenant, or may be a multi-address tenant that is scaling back the number of associated virtual machines to a single virtual machine.

Method 500 also includes, in response to detecting, an act of the load balancer setting a flag for the virtual address to distinguish the virtual address from other virtual addresses that are associated with a plurality of destination addresses (act 504). For example, load balancer 418 can set a variable (e.g., Boolean, integer, string, etc.) or otherwise modify a data structure (e.g., bitmap, table, list, etc.) to distinguish the virtual address as being associated with a single-address tenant.

Method 500 also includes, in response to detecting, an act of the load balancer sending a configuration message to a router, the configuration message interpretable by the router as an instruction to send network packets that are addressed to the virtual address to the destination address in a manner that bypasses the load balancer (act 506). For example, load balancer 418 can send command 430 to router 416. In response to command 430, router 416 sends network packets (e.g., packet 428) addressed to VIP 422b directly to virtualization host 402 (e.g., as packet 428a) instead of to load balancer 418. For example, command 430 may cause router 416 to modify rules 420.

Method 500 also includes, subsequent to sending the configuration message to the router, an act of the load balancer refraining from storing subsequent flow state for the virtual address (act 508). For example, load balancer 418 may refrain from storing subsequent state 424b for VIP 422b. As such, the memory at load balancer 418 that is used to manage VIP 422b is reduced as compared to conventional load balancers, thereby increasing the scalability of load balancer 418.

Method 500, for configuring load balancing for a single-address tenant, may be used to establish a virtual address for a single address tenant, or may be used to scale back a virtual address from being associated with a multi-address tenant to being associated with a single-address tenant. In addition, embodiments of the invention include scaling up a virtual address from being associated with a single-address tenant to being associated with a multi-address tenant. For example, if a tenant increases the number of virtual machines it operates from one to more than one, the virtual address that is associated with that tenant can be scaled up.

Figure 6:
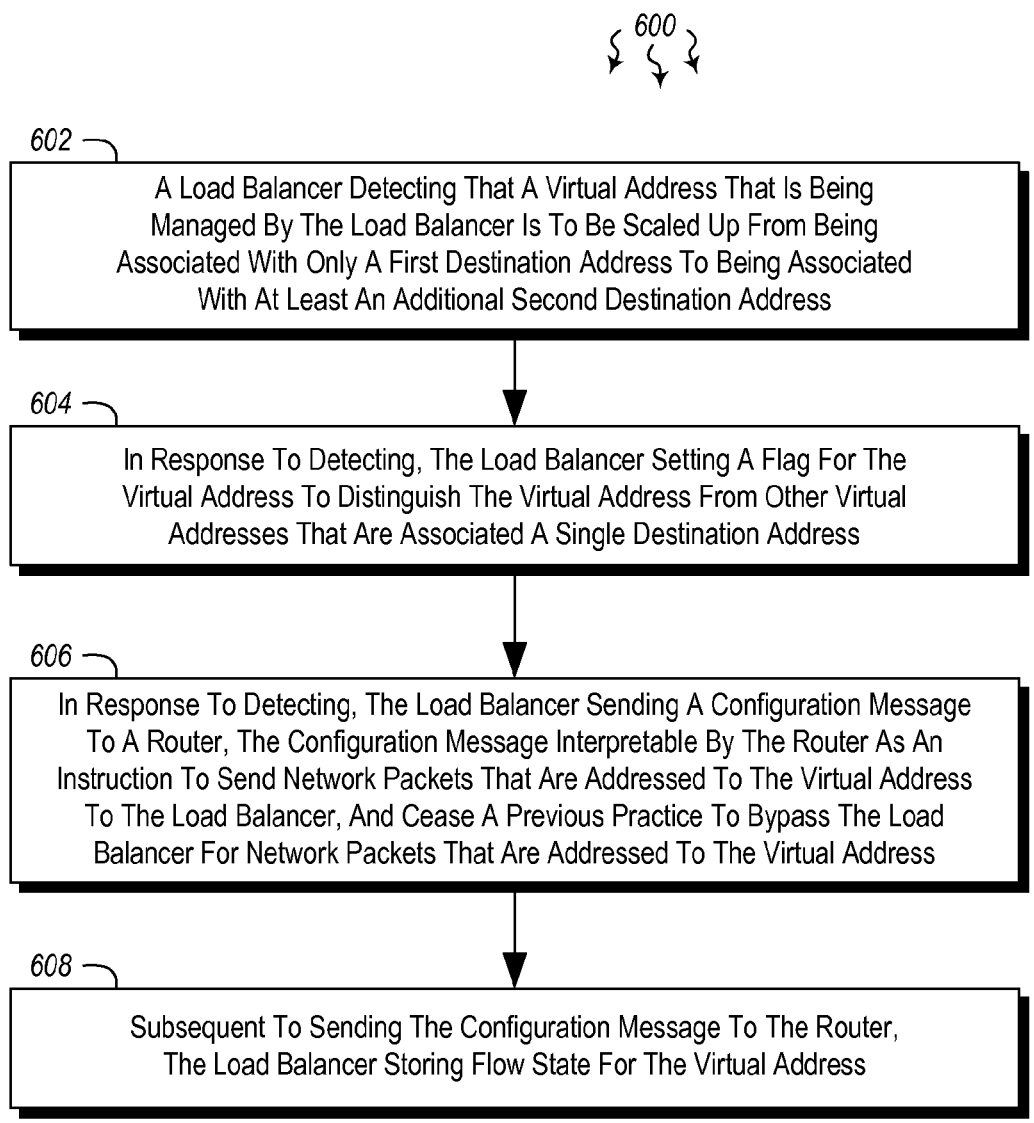
FIG. 6 illustrates a flow chart of an example method for scaling up load balancing for a tenant from a single address to a plurality of addresses.

Along these lines, FIG. 6 illustrates a flowchart of a method 600 for scaling up load balancing for a virtual address from a single destination address to a plurality of destination addresses. Method 600 will be described with respect to the components and data of computer architecture 400.

Method 600 includes an act of a load balancer detecting that a virtual address that is being managed by the load balancer is to be scaled up from being associated with only a first destination address to being associated with at least an additional second destination address (act 602). For example, tenant 406b may be adding one or more additional virtual machines, each associated with an additional destination address. As such, tenant 406b is becoming a multi-address tenant.

Method 600 also includes, in response to detecting, an act of the load balancer setting a flag for the virtual address to distinguish the virtual address from other virtual addresses that are associated with a single destination address (act 604). For example, load balancer 418 can set flag 426b to differentiate VIP 422b as being associated with a multi-address tenant. For example, load balancer 418 can set a variable (e.g., Boolean, integer, string, etc.) or otherwise modify a data structure (e.g., bitmap, table, list, etc.) to indicate that the virtual address as now associated with a multi-address tenant.

Method 600 also includes, in response to detecting, an act of the load balancer sending a configuration message to a router, the configuration message interpretable by the router as an instruction to send network packets that are addressed to the virtual address to the load balancer, and cease a previous practice to bypass the load balancer for network packets that are addressed to the virtual address (act 606). For example, load balancer 418 can send command 430 to router 416. Based on command 430, router 416 can route network packets (e.g., as packet 428) that are addressed to VIP 422b to load balancer 418 (e.g., packet 428b) instead of to virtualization host 402. For example, based on command 430, router 416 may modify rules 420.

Method 600 also includes, subsequent to sending the configuration message to the router, an act of the load balancer storing flow state for the virtual address (act 608). For example, as load balancer 418 receives network packets that are addressed to VIP 422b, load balancer 418 can send those packets to an appropriate destination address (e.g., DIP 410c or another destination address that was added to tenant 406b), and store state information so that subsequent packets in a flow are sent to the same address.

It will be appreciated, after reviewing this disclosure, that some of the acts of methods 500 and 600 need not be performed in the order depicted, and that some of the acts may be performed in parallel. For example, acts 504 and 506 of method 500 may be performed in parallel or in the opposite order than the order that is depicted. Similarly, acts 604 and 606 of method 600 may be performed in parallel or in the opposite order than the order that is depicted.

As indicated previously, in some embodiments, load balancer 418 can be used in connection with destination addresses that are associated with physical machines/servers. For example, load balancer 418 may be used in environments that include physical servers in addition to, or instead of, virtual machines. As such, a tenant may include virtual machines, physical machines, or combinations thereof. Thus, a destination address may be associated with a physical server, instead of a virtual machine.

In some embodiments, load balancer 418 also performs probing for virtual addresses that are associated with multi-address tenants. For example, load balancer 418 may send specific traffic to a server/virtual machine, expecting a response indicating the health of the server/virtual machine. For example, load balancer 418 may establish a network connection with the server/virtual machine, load balancer 418 may send a ping message (e.g., a message configured to elicit a particular response) to the server/virtual machine, load balancer 418 may fetch a Hypertext Transfer Protocol (HTTP) Uniform Resource Locator (URL) at the server/virtual machine, etc. When the probing indicates that the server/virtual machine is in an unhealthy or unknown state (e.g., from a lack of the expected response) load balancer 418 stops sending traffic (e.g., new TCP connections) to the server/virtual machine. In some embodiments, when a server/virtual machine is found to be unhealthy, load balancer 418 can perform healing. For example, if the physical hardware running a virtual machine fails and the virtual machine is re-instantiated on different physical hardware, load balancer 418 can reconfigure router 416 to route network packets to the new physical hardware, such that the virtual address associated with the virtual machine can remain the same and such that network packets can still reach the virtual machine.

Accordingly, the embodiments described herein provide for optimized load balancing for single-address tenants. Embodiments include scaling back load balancing when a virtual address is associated with a single-address tenant, and scaling up load balancing when the virtual address is associated with a multi-address tenant. The embodiments described herein improve the scalability of load balancers, particularly when there is a relatively large number of single-address tenants, and can reduce the number of network hops a network packet takes when it is being sent to a virtual address that is associated with a single-address tenant.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed:

1. At a computer system that includes one or more processors and system memory, the computer system being configured as a load balancer that controls the routing of network packets between virtual addresses and destination addresses, a method for configuring load balancing for a virtual address, the method comprising:

an act of the load balancer detecting that a virtual address that is being managed by the load balancer is associated with only a single destination address;

in response to detecting, an act of the load balancer setting a flag for the virtual address to distinguish the virtual address from other virtual addresses that are associated with a plurality of destination addresses;

in response to detecting, an act of the load balancer sending a configuration message to a router, the configuration message interpretable by the router as an instruction to send network packets that are addressed to the virtual address to the destination address in a manner that bypasses the load balancer;

subsequent to sending the configuration message to the router, an act of the load balancer refraining from storing subsequent flow state for the virtual address;

an act of the load balancer detecting that said virtual address that is being managed by the load balancer is to be scaled up from being associated with only a first destination address to being associated with at least an additional second destination address;

in response to detecting, an act of the load balancer setting a new flag for the virtual address to distinguish the virtual address from other virtual addresses that are associated with a single destination address;

in response to detecting, an act of the load balancer sending a new configuration message to a router, the new configuration message interpretable by the router as an instruction to send network packets that are addressed to the virtual address to the load balancer, and cease a previous practice to bypass the load balancer for network packets that are addressed to the virtual address; and subsequent to sending the new configuration message to the router, an act of the load balancer storing flow state for said virtual address.

2. The method as recited in claim 1, wherein the single destination address is associated with a virtual machine.

3. The method as recited in claim 2, wherein the single destination address is a first single destination address and the configuration message is a first configuration message, and wherein the load balancer is also configured to:

detect that the virtual machine is now only associated with a second single destination address; and in response to detecting, send a second configuration message to the router, the second configuration message interpretable by the router as an instruction to send network packets that are addressed to the virtual address to the second single destination address in a manner that bypasses the load balancer.

4. The method as recited in claim 1, wherein, subsequent to sending the configuration message to the router, an agent along a path between the router and the destination address:

receives a network packet that is addressed to the virtual address; and translates the network packet so that it is addressed to the associated single destination address.

5. The method as recited in claim 4, wherein the agent resides at a virtualization host computer system.

6. The method as recited in claim 4, wherein the agent resides at a computer system that is associated with the destination address.

7. The method as recited in claim 4, wherein the agent detects whether the network packet was sent by the router or by the load balancer, and translates the network packet when it was sent by the router.

8. The method as recited in claim 4, wherein the agent translating the network packet comprises the agent performing a Network Address Translation (NAT) operation on the network packet.

9. The method as recited in claim 8, wherein the agent performing a NAT operation on the network packet comprises the agent changing a destination address of the network packet from the virtual address to the destination address.

10. The method as recited in claim 1, wherein the single destination address is associated with physical hardware.

11. The method as recited in claim 1, wherein the load balancer is also configured to:

detect that a virtual machine that is associated with the single destination address has migrated from a first virtualization host computer to a second virtualization host computer; and in response to detecting, sending a configuration message to the router, the configuration message interpretable by the router as an instruction to send network packets for the virtual address to the second virtualization host computer.

12. At a computer system that includes one or more processors and system memory, the computer system being configured as a load balancer that controls the routing of network packets between virtual addresses and destination addresses, a method for scaling up load balancing for a virtual address from a single destination address to a plurality of destination addresses, the method comprising:

an act of the load balancer detecting that a virtual address that is being managed by the load balancer is to be scaled up from being associated with only a first destination address to being associated with at least an additional second destination address;

in response to detecting, an act of the load balancer setting a flag for the virtual address to distinguish the virtual address from other virtual addresses that are associated with a single destination address;

in response to detecting, an act of the load balancer sending a configuration message to a router, the configuration message interpretable by the router as an instruction to send network packets that are addressed to the virtual address to the load balancer, and cease a previous practice to bypass the load balancer for network packets that are addressed to the virtual address; and subsequent to sending the configuration message to the router, an act of the load balancer storing flow state for the virtual address.

13. The method as recited in claim 12, wherein one or both of the first destination address or the second destination address is associated with a corresponding server.

14. The method as recited in claim 13, wherein the corresponding server for one or both of the first destination address or the second destination address comprises a virtual machine.

15. The method as recited in claim 13, wherein the corresponding server for one or both of the first destination address or the second destination address comprises physical hardware.

16. The method as recited in claim 13, further comprising an act of the load balancer probing one or both of the first destination address or the second destination address to ascertain health of the corresponding server.

17. The method as recited in claim 16, wherein the act of probing one or both of the first destination address or the second destination address comprises one or more of:

establishing a network connection with the corresponding server, sending a ping message to the corresponding server, or fetching a Hypertext Transfer Protocol (HTTP) Uniform Resource Locator (URL) at the corresponding server.

18. The method as recited in claim 16, wherein when the probing indicates that a particular corresponding server is not responding, the load balancer ceases sending network traffic to a destination address associated with the particular corresponding server.

19. The method as recited in claim 12, wherein the load balancer storing flow state for the virtual address comprises the load balancer storing information that identifies the destination address corresponding to active flows.

20. A computer system, comprising:

a router;

a load balancer, the load balancer being configured to:

detect that a virtual address of a tenant that is being managed by the load balancer is associated with only a single virtual machine instance of the tenant;

in response to detecting, set a flag for the virtual address to distinguish the virtual address from other virtual addresses that are associated with multi-address tenants;

in response to detecting, send a configuration message to the router, the configuration message interpretable by the router as an instruction to send network packets that are addressed to the virtual address to the virtual machine in a manner that bypasses the load balancer;

refrain from storing subsequent flow state for the virtual address;

detect that a virtual address that is being managed by the load balancer is to be scaled up from being associated with only a first destination address to being associated with at least an additional second destination address;

in response to detecting, set a new flag for the virtual address to distinguish the virtual address from other virtual addresses that are associated with a single destination address;

in response to detecting, send a new configuration message to the router, the new configuration message interpretable by the router as an instruction to send network packets that are addressed to the virtual address to the load balancer, and cease a previous practice to bypass the load balancer for network packets that are addressed to the virtual address; and subsequent to sending the new configuration message to the router, store flow state for the virtual address; and a virtualization host computer system that is configured to execute the virtual machine instance, the virtualization host computer system including a host agent that is configured to:

detect that a network packet is addressed to the virtual address, and translate the network packet to be addressed to the virtual machine instance.

* * * * *